United States Patent
Ahlin

(10) Patent No.: US 8,340,717 B2
(45) Date of Patent: Dec. 25, 2012

(54) METHOD AND DEVICE FOR DOWNLOADING A FILE VIA A NETWORK

(75) Inventor: Eskil Gunnar Ahlin, Veberod (SE)

(73) Assignee: Sony Ericsson Mobile Communications AB, Lund (SE)

( * ) Notice: Subject to any disclaimer, the term of this patent is extended or adjusted under 35 U.S.C. 154(b) by 486 days.

(21) Appl. No.: 12/315,712

(22) Filed: Dec. 4, 2008

(65) Prior Publication Data

US 2010/0144330 A1   Jun. 10, 2010

(51) Int. Cl.
  *H04M 1/00*   (2006.01)
  *H04M 1/725*  (2006.01)
(52) U.S. Cl. .................. 455/556.1; 455/412.1
(58) Field of Classification Search ............ 455/556.1
  See application file for complete search history.

(56) References Cited

U.S. PATENT DOCUMENTS

| 7,149,509 | B2 * | 12/2006 | Shanahan | 455/418 |
| 7,650,164 | B2 * | 1/2010  | Nguyen et al. | 455/556.2 |
| 8,099,079 | B2 * | 1/2012  | Myllynen et al. | 455/411 |
| 2008/0039058 | A1 | 2/2008 | Ray | |

FOREIGN PATENT DOCUMENTS

| WO | 01/67233 A2 | 9/2001 |
| WO | 03/052610 A1 | 6/2003 |

* cited by examiner

*Primary Examiner* — Hai L Nguyen
(74) *Attorney, Agent, or Firm* — Edwards Wildman Palmer LLP; Peter F. Corless; Steven M. Jensen

(57) ABSTRACT

In an embodiment, a mobile device is provided comprising a network interface and download controller. In an embodiment, the download controller is configured to check if a file to be downloaded can be handled by the mobile device and to transmit a download request to a further device if the mobile device cannot handle the file.

15 Claims, 3 Drawing Sheets

METHOD AND DEVICE FOR DOWNLOADING A FILE VIA A NETWORK

FIELD OF THE INVENTION

The present invention relates to methods and devices for downloading files via a network.

BACKGROUND OF THE INVENTION

Computer networks, e.g. the internet, provide information and contents which may be accessed via the network. As examples for content, various types of files like program files, music files like MP3-files, or video files may be downloaded via the internet and then executed e.g. on a computer to which the respective file was downloaded.

In recent years, mobile devices increasingly became capable of also accessing networks like the internet. E.g., while at first mobile phones were only used for phone calls, modern mobile phones also can access the internet via services like GPRS (General Packet Radio Service) which is a packet oriented mobile data services available to users e.g. of GSM (Global System for Mobile Communications) systems or other 2G cellular communication systems (2G standing for Second Generation Wireless Telephone Technology) as well as of 3G (Third Generation) systems. Another usable mobile telephone communications protocol of the third generation is HSDPA (High Speed Downlink Packet Access). Besides via telephone network, mobile devices may also access networks via other wireless means like WiFi (e.g. the various IEEE 802.11 technologies) or Bluetooth.

Other mobile devices besides mobile phones which may have access to the network are e.g. laptop computers, personal digital assistants or mobile gaming devices.

In many cases, the processing capabilities of such mobile devices as well as the storage available in such mobile devices for storing files are inferior to those of conventional personal computers. While the memory of modern mobile phones often may expand e.g. using memory cards to the order of some gigabytes, modern personal computers have hard disks with storage capacities of some hundred gigabytes up to terabytes. Moreover, microprocessors used in mobile phones, due to the size and power requirements of such devices, in many cases have lesser processing capabilities than processors used in personal computers.

For these reasons, while mobile devices may have access to a network like the internet, they may not be able to download and/or process some of the files available for download in the network, due to the size of the file, due to the type of the file or due to limitations of the download speed available in the mobile device.

SUMMARY OF THE INVENTION

According to an embodiment, a mobile device is provided, comprising:
a network interface configured to couple the mobile device with a network, and
a download controller, said download controller being configured to: upon receiving a request from a user of the mobile device to download a file via said network, check if the mobile device can handle the file,
cause the mobile device to download the file if the mobile device can handle the file, and
transmit a download request to a further device coupled with said network to cause the further device to download the file if the mobile device cannot handle the file.

According to an embodiment, said download controller may be further configured to, prior to said transmitting a download request, query the user if the download request should be transmitted to the further device, and to perform said transmitting the download request only if the user confirms that the download request should be transmitted to the further device.

According to an embodiment, the download controller may be further configured to query the user if, in case the mobile device cannot handle the file, the further device should convert the file to a format which can be handled by the mobile device, and, if the user confirms that the file should be converted, to transmit an indication that the file should be converted to said further device.

According to an embodiment, the mobile device may be further configured to receive a version of said file converted into a format the mobile device can handle from said further device.

According to an embodiment, said checking if the mobile device can handle the file may comprise at least one check selected from the group consisting of a check if a storage capacity of the mobile device is sufficient for the file, a check if a bandwidth of a connection to the network is sufficient to download the file within a predetermined time, and a check if the file has a file format processable by the mobile device.

According to an embodiment, the mobile device may be selected from the group consisting of a mobile phone, a personal digital assistant, a laptop computer and a portable gaming device.

According to an embodiment, said network interface may comprise circuitry to connect the mobile device to a mobile phone network.

According to another embodiment, a device is provided, comprising:
a network interface configured to couple the device with a network,
a mass storage, and
a download controller, said download controller being configured to:
receive a request to download a file via said network from a mobile device, and
cause the device to download said file and store said file in said mass storage.

According to an embodiment, said download controller may further be configured to check if said file comprises a pointer to a further file, and to cause said device to download said further file and to store said further file in said mass storage if said file points to a further file.

According to an embodiment, said download controller may further be configured to convert said file into a format processable by said mobile device and to cause said device to transmit said file converted into said readable format to said mobile device.

According to an embodiment, said converting may comprise at least action selected from the group consisting of a conversion of file format, a change of resolution of graphics comprised in said file and conversion of said file into a data stream usable for streaming.

According to an embodiment, said device may be selected from the group consisting of a network attached storage, a personal computer and a laptop computer.

According to a further embodiment, a method is provided, comprising:
receiving a request to download a file via a network from a user, checking if a mobile device can handle the file, download the file to the mobile device if the mobile device can handle the file, and transmitting a download request to a further device coupled to said network if the mobile device cannot handle the file.

According to an embodiment, the method may further comprise:

receiving said download request at said further device, and downloading said file to said further device.

According to an embodiment, the method may further comprise:

converting said file at said further device into a format which the mobile device can handle, and transmitting the converted file to the mobile device.

DETAILED DESCRIPTION OF THE INVENTION

Figure 1:
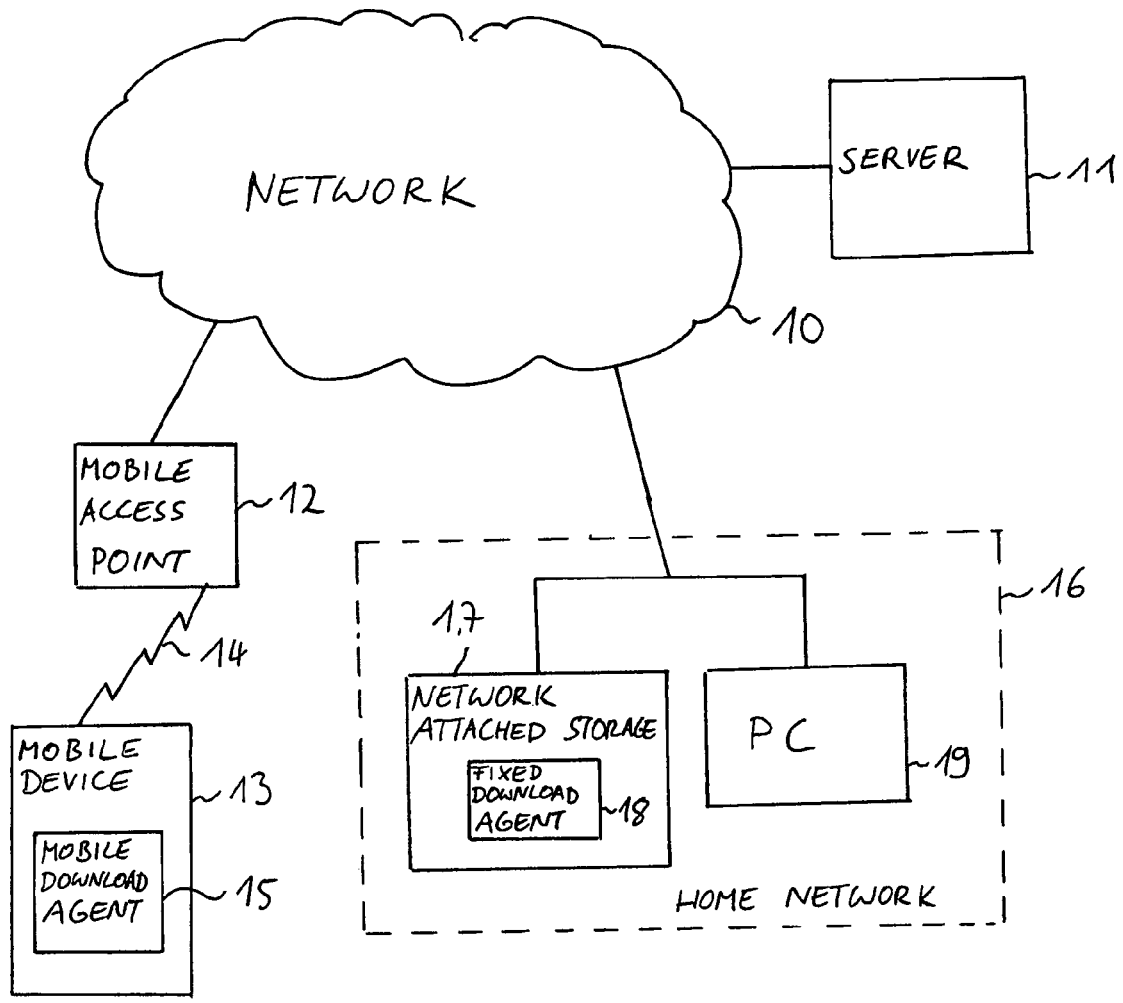
FIG. 1 shows a system according to an embodiment of the present invention.

In the following, embodiments of the present invention will be described in detail with reference to the attached drawings. It is to be noted that the embodiments described hereinafter are merely intended to illustrate the present invention and are not to be construed as limiting the scope thereof.

It is to be understood that in the following description of embodiments any direct connection or coupling between functional blocks, devices, components, circuit elements or other physical or functional unit shown in the drawings or described herein, i.e. any connection without intervening elements, could also be implemented by an indirect connection or coupling, i.e. a connection or coupling with one or more additional intervening elements.

Furthermore, it should be appreciated that the partitioning of some of the embodiments described herein into functional blocks or units shown in the drawings is not to be construed as indicating that these blocks or units necessarily are implemented physically separate. Generally, functional blocks or units may be implemented as separate circuits, chips or elements, but two or more functional blocks or units may also be implemented in a common circuit or chip.

It is to be understood that features of various embodiments described hereinafter may be combined with each other unless specifically noted otherwise.

Furthermore, it is to be understood that describing an embodiment comprising a plurality of elements or units is not to be construed as indicating that all these elements or units are necessary for practicing the present invention. Instead, in other embodiments, only some of such elements or units and/or alternative elements may be present.

It is to be noted that any directional terminology like "top", "bottom", "left" or "right" used in the following detailed description is merely used for easy reference to certain portions of the drawings and is not to be construed as limiting the actional positioning of elements of embodiments in implementations thereof.

Turning now to the figures, in FIG. 1 a system according to an embodiment of the present invention is shown.

The system shown in FIG. 1 comprises a network 10. Network 10 may e.g. be the internet, but may also be any other computer network, e.g. a local area network (LAN) of a company or other institution.

Various entities are connected via network 10. E.g. a server 11 is connected to network 10. Server 11 may provide files like music files, video files and/or program files for download via network 10 to other entities connected to the network. While only a single server 11 is shown in FIG. 11, network 10 may comprise or be coupled with any number of servers. As an example, via the internet many thousands of servers which provide files for download are accessible.

Furthermore, a home network 16 of a user is connected to network 10. In the example shown, home network 16 comprises a personal computer 19 and a network attached storage 17. Home network 16 may be connected to network 10 via a fast connection like a DSL (Digital Subscriber Line) connection, e.g. an ADSL (Asymmetric Digital Subscriber Line) connection or a VDSL (Very High Bit Rate Digital Subscriber Line) connection. Network attached storage 17 in the embodiment of FIG. 1 comprises a fixed download agent (FDA) 18. Fixed download agent 18 serves as download controller controlling downloads handled by network attached storage 17. Examples for a suitable network attached storage 17 and the operation of fixed download agent 18 will be explained further below in more detail.

It should be noted that the term home network is not to be construed as indicating that network 16 necessarily has to be in a private home of a user, but also may be part of e.g. a company's network of a company the user works at. Moreover, while home network 16 is depicted as comprising a network attached storage 17 and personal computer 19 in the embodiment of FIG. 1, home network 16 may comprise a plurality of personal computers, other networking capable elements or more than one network attached storage 17. In another embodiment, the functionality of network attached storage 17 may be implemented in personal computer 19 such that, in such an embodiment, the home network 16 comprises e.g. only personal computer 19 or a plurality of personal computers.

Furthermore, in FIG. 1 a mobile access point 12 is shown connected to network 10. Mobile access point 12 provides wireless access to network 10 for mobile devices. Mobile access point 12 may e.g. be a WiFi access point (e.g. a WLAN access point), a base station of a telephone network providing access to the internet as described in the introductory portion, or a Bluetooth access point.

A mobile device 13 as indicated by 14 may gain access to network 10 via mobile access point 12.

In the embodiment of FIG. 1, mobile device 13 comprises a mobile download agent (MDA) 15 which is used to handle downloads of files via network 10, e.g. from server 11, to mobile device 13. In other words, mobile download agent 15 acts as a download controller controlling downloads a user wants to carry out using mobile device 13. The functioning of mobile download agent 15 will be explained further below in more detail.

Figure 2:
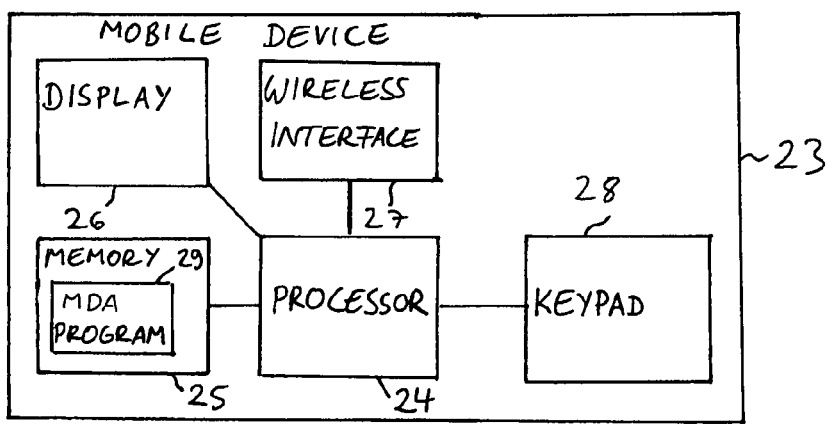
FIG. 2 shows a mobile device according to an embodiment of the present invention.

Turning now to FIG. 2, a mobile device 23 according to an embodiment of the present invention is shown in more detail. Mobile device 23 of the embodiment of FIG. 2 may e.g. be a mobile phone, a personal digital assistant, a mobile gaming device or a laptop computer and may serve as an example for mobile device 13 of FIG. 1.

In the embodiment of FIG. 2, mobile device 23 comprises a processor 24, a memory 25, a display 26, a wireless interface 27 and a keypad 28. Processor 24 controls the operation of mobile device 23. Memory 25 may comprise a random access memory (RAM), a read only memory (ROM), a flash memory and/or any other suitable type of memory and may store programs or routines executable on processor 24 for operating mobile device 23 as well as other files, e.g. files downloaded via a network as will be explained below. In the embodiment of FIG. 2, in memory 25 an MDA program 29 is stored which, when executed on processor 24, represents an implementation of mobile download agent 15 of the embodiment of FIG. 1. Therefore, in the embodiment of FIG. 2, the MDA is implemented as software. In other embodiments, an MDA may be fully or partially implemented in hardware, e.g. by an ASIC (Application Specific Integrated Circuit).

Display 26 may display messages to a user of mobile device 23, and keypad 28 may be used by a user to input information into the mobile device. In case mobile device 23 is a mobile phone, keypad 28 may e.g. be the numerical keypad of the mobile phone, but may also comprise additional buttons, joysticks or other input devices enabling a user to input information or comments. Furthermore, display 26 may be a touch sensitive display in an embodiment and therefore be also used for inputting information.

Wireless interface 27 comprises circuitry usable by processor 24 to connect to a network via a mobile access point like mobile access point 12 of FIG. 1. E.g. wireless interface 27 may comprise circuitry for connecting to a telephone network, a WiFi network and/or a Bluetooth network. It should be noted that in some embodiments mobile device 23 may comprise a wireless interface capable of connecting with more than one type of mobile access point, e.g. may comprise both circuitry for connecting to a telephone network and Bluetooth or WiFi circuitry.

It should be noted that the components of mobile device 23 of the embodiment of FIG. 2 are not limited to the ones shown and further components, e.g. components which are not immediately relevant for the embodiments of the invention, but which relate to conventional functioning of the respective mobile device, may be present. E.g., in case mobile device 23 is a mobile phone, components like a SIM card reader or an interface for connecting mobile device 23 with a desktop computer, e.g. a USB interface, may be present. In case mobile device 23 e.g. is a laptop computer, components like a hard disk, interfaces like monitor interfaces or USB interfaces or any other component conventionally found in laptop computers may be present.

Figure 3:
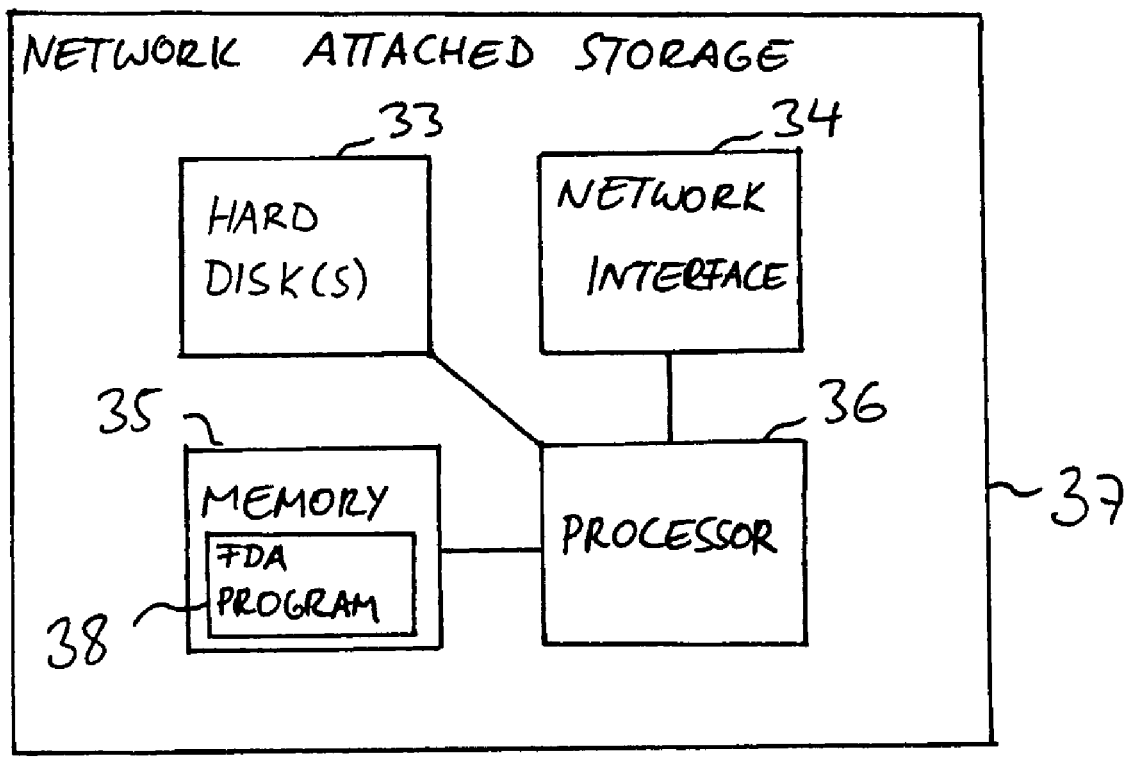
FIG. 3 shows a network attached storage according to an embodiment of the present invention.

Turning now to FIG. 3, a network attached storage 37 according to an embodiment of the present invention is shown. Network attached storage 37 is an example for network attached storage 17 of the embodiment of FIG. 1.

Network attached storage 37 in the embodiment of FIG. 3 comprises a processor 36 for controlling the operation of network attached storage 37, a memory 35, a network interface 34 and one or more hard disks 33. Other embodiments may comprise alternative and/or further components.

Memory 35 may comprise a random access memory (RAM), a read only memory (ROM), a flash memory and/or any other suitable type of memory for storing programs and data. Programs stored in memory 35 may be executed by processor 36.

In particular, in embodiment of FIG. 3 an FDA program 38 is stored in memory 35 which, when executed in processor 36, implements fixed download agent 18 of the embodiment of FIG. 1. In other words, in the embodiment of FIG. 3 the fixed download agent is implemented in software. In other embodiments, a fixed download agent may be fully or partially implemented in hardware, e.g. in an ASIC.

Via network interface 34, network attached storage 37 has access to a network. Depending on the location of network attached storage 37, network interface 34 may e.g. comprise an Ethernet interface to connect to a local network like homework 16 of FIG. 1 which in turn is connected to a greater network like the internet or may e.g. comprise a DSL modem to connect to the internet via a DSL service provider. In still other embodiments, network interface 34 additionally or alternatively may comprise a wireless interface, e.g. a WiFi interface with high bandwidth.

Hard disks 35 provide a mass storage for storing files downloaded via network interface 34 and a correspondingly attached network and to provide files via network interface 34. E.g., in the embodiment of FIG. 1 PC 19 may retrieve files from hard disks 33 of network attached storage 17 of the embodiment of FIG. 1 implemented as shown in FIG. 3.

It should be noted that the present invention is not limited to hard disks as mass storage, but any suitable storage may be provided for downloading files via a network, e.g. so-called solid state disks, digital versatile disks (DVDs), or blue ray disks.

Next, an example for the operation of a mobile download agent like mobile download agent 15 of FIG. 1 and a fixed download agent like fixed download agent 18 of the embodiment of FIG. 1 and their interaction with each other according to an embodiment will be explained with reference to FIG. 4. On the left side of a dashed line 65 in FIG. 4, operations or actions performed in a mobile device, e.g. by a mobile download agent 15 of mobile device 13 of the embodiment of FIG. 1, are shown, while on the right side of dashed line 65 operations or actions performed in a network attached storage, e.g. performed by fixed download agent 18 of network attached storage 17 of the embodiment of FIG. 1, are shown.

At 40, the mobile download agent of the mobile device receives a download request by a user of the mobile device. Such a download request may be generated when the user "surfs" the internet and finds a file offered for download he or she is interested in, or when a user receives a mail or message indicating a file of interest. For the internet, the location of the file is usually given by a uniform resource locator (URL).

At 41, the mobile download agent checks whether the file to be downloaded can be handled by the mobile device. E.g., the mobile download agent may check if the size of the file does not exceed the storage space available in the mobile device, e.g. space available in memory 25 of FIG. 2, or if, given the size of the file to be downloaded and the data rate available in the respective connection to the network, the downloading of the file does not exceed a minimum time. Another check which may be performed is whether the type of file can be handled by the mobile device. E.g., for graphic or sound files a plurality of different encoding mechanisms and therefore file types exist which all require specific programs for viewing or reproducing, such that when the corresponding program is not present on the mobile device, the respective file type cannot be handled. E.g., formats for graphic files include jpeg, gif, various so-called RAW formats by camera manufacturers, tiff, bitmap, just to name a few. Likewise, sound files may e.g. be so called "WAV" files or MP3 files. Moreover, files which can be downloaded via networks like the internet include programs executable e.g. on windows computers which cannot easily be executed on certain types of mobile devices like conventional mobile phones.

In summary, there may be a plurality of different reasons why a specific file cannot be handled by the mobile device.

If at 41 it is decided that the file can be handled by the mobile device, at 42 the file is downloaded, and at 43 the operation of the mobile download agent is ended. Thereafter, the downloaded file may be further used in the mobile device.

In case the mobile download agent at 41 decides that the file cannot be handled by the mobile device, at 44 the user of the mobile device is queried if the file should be downloaded to a network attached storage, e.g. to network attached storage 17 in the user's home network 16 in the embodiment of FIG. 1. If the user decides that this should not be done, at 43 the operation of the mobile download agent for this download is ended. If the user confirms that the file should be downloaded to the network attached storage, at 45 a corresponding download request is transmitted to the network attached storage. This transmission e.g. in the embodiment of FIG. 1 may be made from mobile download agent 15 of mobile device 13 via mobile access point 12 and network 10 to network attached storage 17, in particular fixed download agent 18 thereof, in home network 16. This transmit request comprises an identifier of the file to be downloaded, e.g. the abovementioned URL.

At the network attached storage, at 47 the download request from the mobile device is received by the fixed download agent of the network attached storage. At 48, the network attached storage downloads the requested file.

At 49, it is checked whether the downloaded file comprises a pointer to a further file. Examples for files pointing at further files comprise files used in the context of so-called peer to peer file sharing protocols. An example for such a protocol is bit torrent, which uses .torrent files which comprise a pointer to the actual file to be downloaded, e.g. in the form of a URL. If at 49 it is recognized that the downloaded file comprises a pointer to a further file, at 50 the further file is downloaded, which is repeated until at 49 it is decided that the last downloaded file does not comprise any pointer to a further file.

At 51, it is checked if the downloaded file or downloaded files is/are convertible to a format usable by the mobile device from which the download request was received at 47. E.g., if a particular graphic format is not usable by the mobile device, e.g. if the mobile device cannot process gif files, it may be possible to convert the file to a format readable by the mobile device, e.g. a jpeg file. As another example if e.g. a high resolution video file, e.g. a video file with a frame resolution corresponding to so-called full HD, i.e. 1920×1080 pixels, with a corresponding file size which is to large to be handled by the mobile device was downloaded, the video may be converted to a lower resolution, e.g. a resolution of 720×576 pixels, thus reducing the file size.

If at 51 it is decided that the file or files is/are not convertible to a format usable by mobile device, at 52 the operation of the fixed download agent of the network attached storage is ended for this download. In this case, the files are now stored in the network attached storage and may be accessed later, in the example of FIG. 1 e.g. by personal computer 19.

In case at 51 it is found that the files are convertible, at 53 a query is generated and transmitted to the mobile device asking if the file or files should be converted and transmitted to the mobile device.

This query at 54 is received by the mobile download agent of the mobile device. At 55 the user is queried if he desires that the file be converted and transmitted to the mobile device. E.g., in case of video files as mentioned above, the user may want to view the video on the mobile device right away, but may also prefer to view the video later at home.

At 56, the response of the user is transmitted to the network attached storage and received at 57 by the fixed download agent of the network attached storage.

At 58, it is checked whether the response is positive or not, i.e. whether it indicates that the file or files should be converted or not. If this is not the case, at 59 the operation of the fixed download agent of the network attached storage for this download is ended. If the response is positive, at 60 the file(s) is/are converted and at 61 the converted file(s) is/are transmitted to the mobile device. In the mobile device, at 62 the converted file(s) is/are received, and at 63 the operation of the mobile download agent of the mobile device for this download is ended. The received converted files can then be processed and/or further used in any way desired by the user.

The conversion of files 60 may e.g. be performed as described above, e.g. by reducing the resolution or converting the file to a different file format. Furthermore, at 61 the transmission of the converted files may be performed as a so-called "streaming". When streaming files, the corresponding file, in this case usually a video file or an audio file, is not transmitted as a whole at first before it can be used at the mobile device, but is transmitted as continuous stream which immediately can be used, e.g. played back in case of video or audio files, at the mobile device.

It should be noted that the embodiments described above are only some examples for implementing the present invention, and a plurality of modifications and variations are possible, some of which will be explained below.

In the above embodiments, a mobile device was described connectable to a network via a wireless access, e.g. via a telephone network. In other embodiments, a mobile device may comprise an interface to connect to a network in a wire based manner. E.g., a laptop computer may comprise a modem for connecting to a network via a wire based telephone network or an ethernet port for connecting to a local area network.

As already mentioned, while in the embodiments above a network attached storage was used as a stationary device for performing downloads after having received corresponding instructions from a mobile device, the same functionality may be implemented in other devices, e.g. a personal computer (PC), or also a further mobile device which has capabilities the mobile device sending the download request to the further mobile device has not. E.g., a mobile phone may instruct a laptop computer to download certain files.

Figure 4:
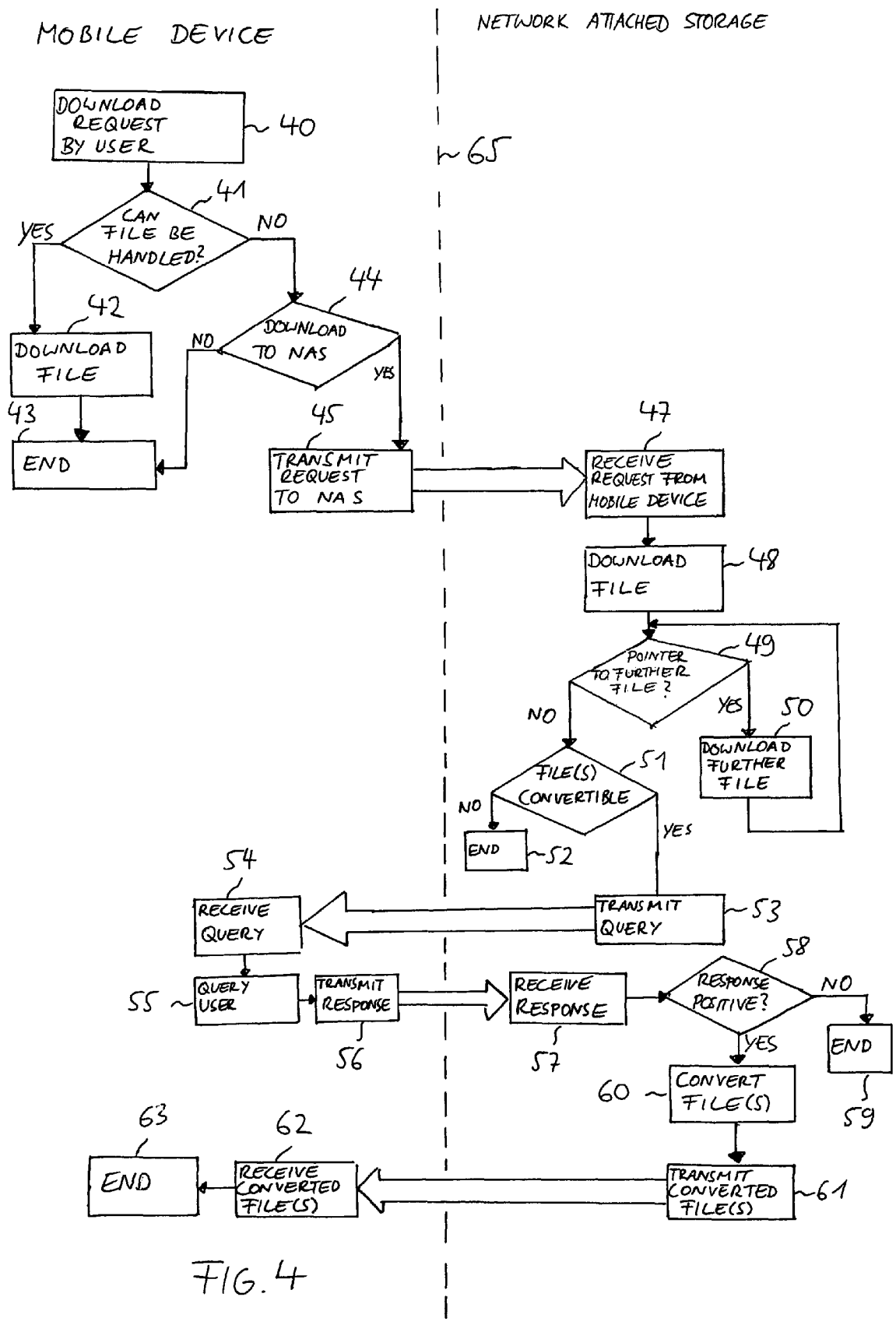
FIG. 4 shows a flow diagram illustrating methods according to some embodiments of the present invention.

In the embodiment of FIG. 4, the part bearing reference numerals 51 to 63 may be omitted. In other words, in an embodiment one or more files are simply downloaded by the network attached storage without any further conversion or processing.

In the embodiment of FIG. 4, at 44 and at 53 to 58, a user is queried on how to proceed. In other embodiments, one or both of these queries may be omitted and the operation may be continued as if the user had answered affirmative. E.g., in case a file to be downloaded cannot be handled by the mobile device, the query at 44 may be omitted and the download request may be unconditionally transmitted to the network attached storage at 45. In an embodiment, at which point the user is queried may be user configurable.

Moreover, in the embodiment of FIG. 4 at 51 it is checked whether the files are convertible, and then the user is queried by transmitting a query from the network attached storage to the mobile device. In another embodiment, the mobile download agent of the mobile device has a list stored which type of files may be converted into a format the mobile device can handle, e.g. in memory 25 in the embodiment of FIG. 2, and if the file in question is such an convertible file, the query whether to perform the conversion may be incorporated at 44. In this case, at 45 the download request is transmitted together with the information whether to convert the file or not to the network attached storage.

As can be seen, numerals modifications are possible, and the scope of the present invention is not to be construed as being limited by the above-described embodiments, but is intended to be limited only by the appended claims and equivalents thereof.

What is claimed is:

1. A mobile device connected to a network, comprising:
   a network interface configured to couple the mobile device with the network, and
   a download controller, said download controller being configured to:
   upon receiving a request from a user of the mobile device to download a file via said network, check if the mobile device can handle the file, cause the mobile device to download the file if the mobile device can handle the file, and transmit a download request to a further device also connected with said network to cause the further device to download the file only if the mobile device cannot handle the file.

2. The mobile device of claim 1, wherein said download controller is further configured to, prior to said transmitting the download request, query the user if the download request should be transmitted to the further device, and to perform said transmitting the download request only if the user confirms that the download request should be transmitted to the further device.

3. The mobile device of claim 1, wherein the download controller is further configured to query the user if; in case the mobile device cannot handle the file, the further device should convert the file to a format which can be handled by the mobile device, and, if the user confirms that the file should be converted, to transmit an indication that the file should be converted to said further device.

4. The mobile device of claim 1, wherein the mobile device is further configured to receive a version of said file converted into a format the mobile device can handle from said further device.

5. The mobile device of claim 1, wherein said checking if the mobile device can handle the file comprises at least one check selected from the group consisting of a check if a storage capacity of the mobile device is sufficient for the file, a check if a bandwidth of a connection to the network is sufficient to download the file within a predetermined time, and a check if the file has a file format processable by the mobile device.

6. The mobile device of claim 1, wherein the mobile device is selected from the group consisting of a mobile phone, a personal digital assistant, a laptop computer and a portable gaming device.

7. The mobile device of claim 1, wherein said network interface comprises circuitry to connect the mobile device to a mobile phone network.

8. A device connected to a network, comprising:
   a network interface configured to couple the device with the network,
   a mass storage, and
   a download controller, said download controller being configured to:
   receive a request to download a file via said network from a mobile device also connected to the network, and cause the device to download said file and store said file in said mass storage only if the mobile device cannot handle the file.

9. The device of claim 8, wherein said download controller is further configured to check if said file comprises a pointer to a further file, and to cause said device to download said further file and to store said further file in said mass storage if said file points to a further file.

10. The device of claim 8, wherein said download controller is further configured to convert said file into a format processable by said mobile device and to cause said device to transmit said file converted into said readable format to said mobile device.

11. The device of claim 10, wherein said converting comprises at least action selected from the group consisting of a conversion of file format, a change of resolution of graphics comprised in said file and conversion of said file into a data stream usable for streaming.

12. The device of claim 8, wherein said device is selected from the group consisting of a network attached storage, a personal computer and a laptop computer.

13. A method, comprising:
   connecting a mobile device and a further device to a network;
   receiving a request to download a file via the network from a user,
   checking if the mobile device can handle the file,
   downloading the file to the mobile device if the mobile device can handle the file, and
   transmitting a download request to the further device coupled to said network only if the mobile device cannot handle the file.

14. The method of claim 13, further comprising: receiving said download request at said further device, and downloading said file to said further device.

15. The method of claim 14, further comprising: converting said file at said further device into a format which the mobile device can handle, and transmitting the converted file to the mobile device.

* * * * *